United States Patent [19]

Grethen et al.

[11] Patent Number: 4,743,410

[45] Date of Patent: May 10, 1988

[54] METHOD FOR MANUFACTURING A FLAT ILLUMINATION UNIT

[75] Inventors: Hartmut Grethen; Werner Nickel; Udo Scheer, all of Berlin, Fed. Rep. of Germany

[73] Assignee: Siemens Aktiengesellschaft, Berlin and Munich, Fed. Rep. of Germany

[21] Appl. No.: 845,567

[22] Filed: Mar. 28, 1986

[30] Foreign Application Priority Data

Mar. 29, 1985 [DE] Fed. Rep. of Germany ....... 3512093
Mar. 13, 1986 [EP] European Pat. Off. ........ 86730042.8

[51] Int. Cl.[4] ............................ B29D 11/00

[52] U.S. Cl. ............................ 264/1.4; 264/1.7; 264/1.9; 264/2.5; 264/139; 264/219; 264/220

[58] Field of Search .................. 264/1.3, 1.9, 2.5, 2.7, 264/139, 219, 1.4, 220, 225, 1.7; 425/808

[56] References Cited

U.S. PATENT DOCUMENTS

| | | | |
|---|---|---|---|
| 2,185,492 | 1/1940 | Barrett | 264/139 |
| 2,274,907 | 3/1942 | Madula | 264/139 |
| 3,238,859 | 3/1966 | Mauchly | 95/73 |
| 3,431,333 | 3/1969 | Fiornascente | 264/219 |
| 4,408,833 | 10/1983 | Gowan | 264/1.9 |
| 4,478,769 | 10/1984 | Pricone et al. | 264/1.9 |
| 4,482,511 | 11/1984 | Komatsubara | 264/2.5 |
| 4,619,804 | 10/1986 | Leonard et al. | 264/2.5 |

FOREIGN PATENT DOCUMENTS

| | | | |
|---|---|---|---|
| 529977 | 6/1955 | Italy | 264/139 |
| 29630 | 2/1983 | Japan | 264/1.9 |
| 72105 | 4/1983 | Japan | 264/1.9 |

OTHER PUBLICATIONS

"Grossflachige Elektrolumineszenz-Anzeigeeinheit", Elektronik, Nov. 30, 1984, vol. 24, p. 114.

*Primary Examiner*—James Lowe
*Attorney, Agent, or Firm*—Hill, Van Santen, Steadman & Simpson

[57] ABSTRACT

A method for manufacturing a flat illumination unit provides light guide channels in the form of transparent rods arranged in lines on the upper side of a plate. The upper side of a plate is coated with a casting compound and, after hardening of the casting compound, the plate is eroded from the opposite side until only the light guide channels remain respectively surrounded on three sides by the casting compound and therewith form a film.

21 Claims, 4 Drawing Sheets

FIG 1A
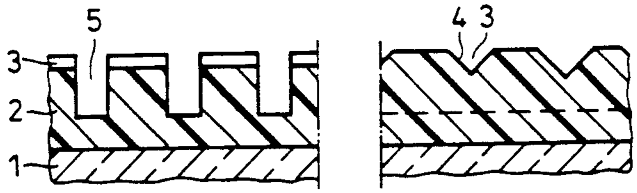
FIG 1B
FIG 2A
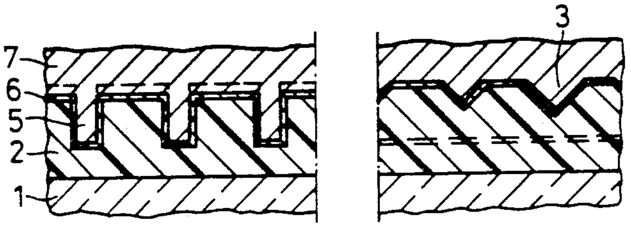
FIG 2B
FIG 3A
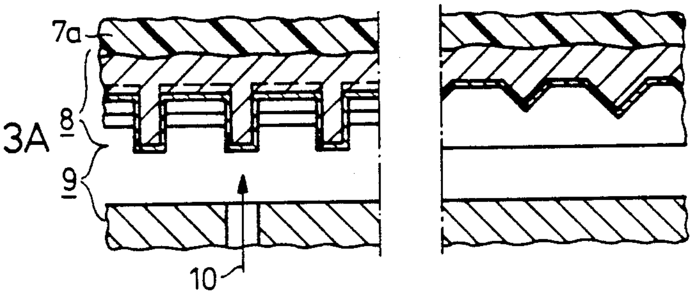
FIG 3B
FIG 4A
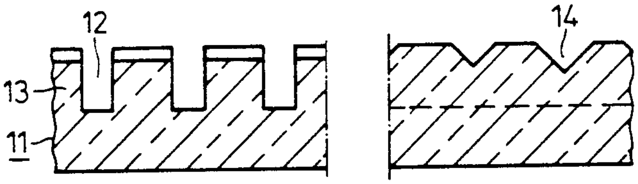
FIG 4B
FIG 5A
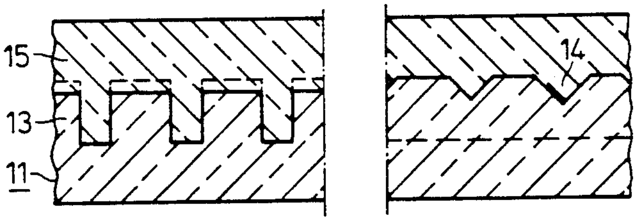
FIG 5B
FIG 6A
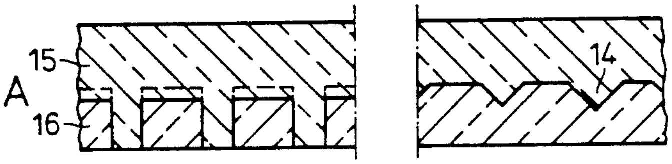
FIG 6B FIG 10A
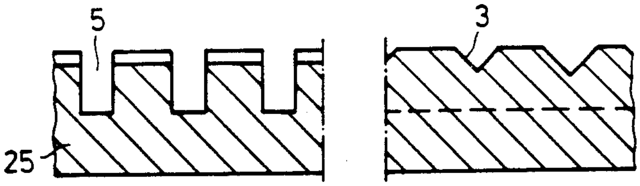
FIG 10B
FIG 11A
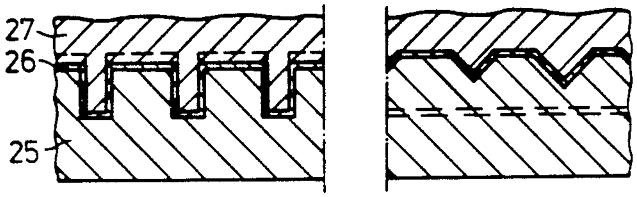
FIG 11B
FIG 12A
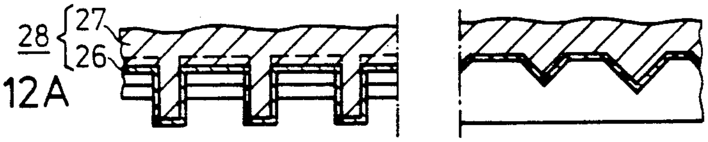
FIG 12B
FIG 13A
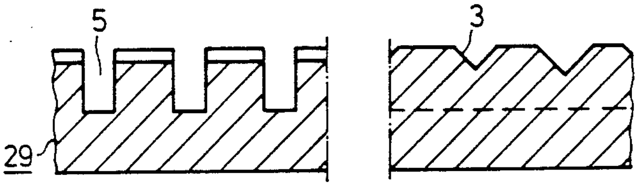
FIG 13B
FIG 14A
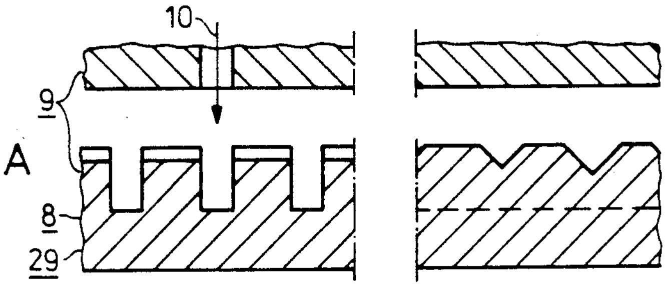
FIG 14B
FIG 15A
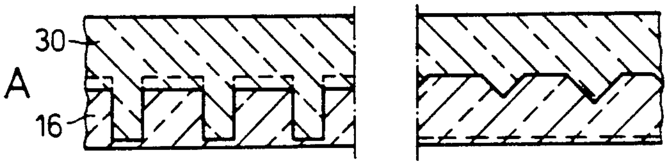
FIG 15B

METHOD FOR MANUFACTURING A FLAT ILLUMINATION UNIT

BACKGROUND OF THE INVENTION

1. Field of the Invention

The present invention relates to a method of manufacturing an illumination unit of the general type as disclosed in the German patent application P 34 34 806.9.

2. Description of the Prior Art

Illumination units of the type set forth above have light guide channels located as lines with light beam coupled into their end faces and along which light can be coupled out from light exit regions in the channel wall. The illumination unit forms a component of a scanning device for illuminating and optionally scanning a planar original. In the scanning device, the illumination unit serves the purpose of microline-by-microline illumination of an original, whereby the light reflected from the original is acquired in columns with the assistance of light receiving elements. The illumination of individual microlines can therefore occur uniformly over the length of the respective microline in that light coupled into the end face in microline-associated light guide channels is continuously coupled out along the respective light guide channel, being coupled out from the channel wall thereof onto the microline. However, a progressive, successive light outcoupling along the longitudinal axis of the light guide channels is also possible, for example by way of a sound wave packet migrating along the light guide channel.

The present invention departs from the basis of a method for manufacturing a flat illumination unit.

Such an illumination unit is described in the publication "Elektronik", No. 24, 1984, p. 114. This known illumination unit is designed as an electroluminescence display unit in which individually selectable image points in the form of individually controllable electrolu-minescene elements are arranged in a display surface 256 lines and 512 columns. A control and driver electronics for selecting the individual image points is also integrated in the known illumination unit. The structural height of the known illumination unit amounts to 0.8 inches (roughly 2 cm).

U.S. Pat. No. 3,238,859, also fully incorporated herein by this reference, discloses an illumination unit as a component of a photocopier device. The known illumination unit contains a flat electroluminescence layer which is situated in a film arrangement between two transparent, electrically conductive film electrodes. By charging the film electrodes with an alternating voltage, the electroluminescence layer is energetically excited so that it lights up uniformly over its area.

SUMMARY OF THE INVENTION

The object of the present invention is to provide a method which enables the manufacture of illumination units having light emission controllable at least line-wise in a very flat construction and with comparatively few component parts. An attendant object is to enable the manufacture of the flat illumination units in a cost-effective manner in high numbers of items given a respectively constant quality, whereby a particularly exact arrangement and fashioning of the light guide channels is to be guaranteed.

In order to achieve the above object in a method for manufacturing a flat illumination unit, light guide channels in the form of transparent rods are fashioned in the manner of lines on the upper side of a plate in accordance with the present invention; the upper side of the plate is coated with a casting compound covering the light guide channels and filling out the clearances between the light guide channels and, after the casting compound has hardened, the plate is erroded to such a degree that only the light guide channels now respectively remain, surrounded by the casting compound on three sides.

The method of the present invention enables the manufacture of flat illumination units with comparatively few component parts on the basis of the rods forming the light guide channels, whereby an extremely flat structure of the illumination unit derives in that the rods are fashioned thin. After hardening, the casting compound forms a film which respectively surrounds the light guide channels on three sides, so that only one side of the light guide channels is exposed for coupling out light fed into the light guide channels. The light guide channels are therefore embedded in the film and well protected from external influences. In that the light guide channels are previously arranged on the plate, a high accuracy with respect to their later arrangement in the film can be achieved.

A transparency of the film can be desirable for various applications of the illumination unit when, for example, an original to be illuminated line-by-line by the illumination unit should be at least roughly visible through the film or when, given utilization of the illumination unit in a scanning device, the film comprising the light guide channels is arranged closer to the original than light receiving elements. In this case, it is to be considered advantageous when transparent material is employed as the casting compound, the optical index of refraction thereof being lower than that of the light guide channels. What is achieved, therefore, is that, on the one hand, the film is transparent and, on the other hand, the light conducted in the light guide channels experiences a total deflection in the boundary region between the light guide channels and the film, whereby influences of scattered light between respectively neighboring light guide channels are avoided. A diminution of the influences of scattered light can also be advantageously achieved in that the light guide channels arranged on the upper side of the plate are mirrored before being coated with casting compound.

A particularly cost-effective manufacture of the flat illumination units is achieved, according to the present invention, in that the light guide channels are individually pressed from transparent m;aterial and are secured to the upper side of the plate in a line-wise arrangement. After the light guide channels have been coated with the casting compound, the plate is stripped from the cast out light guide channels. In order to create micropoint-associated light exit regions, notches can be additionally impressed on the surface of the light guide channels facing away from the surface for fastening the plate, this being carried out during pressing of the light guide channels and the light laterally coupled to the light guide channels being coupled out therefrom at the notches.

A particularly high accuracy in fashioning the light guide channels with respect to their dimensions and their arrangements in the film formed by the casting compound is achieved in that the plate is manufactured of transparent material and in that the light guide channels are fashioned in the form of web-like elevations of the plate.

Advantageously the plate is cast of transparent plastic using a bottom die which is provided with depressions corresponding to the web-like elevations to be fashioned in the plate. As a result thereof, in particular, and especially precise arrangements and fashioning of the web-like elevations or, respectively, of the later light guide channels in the layer is guaranteed.

The transparent plate can be manufactured, for example, in an injection molding method in that the bottom die is employed as a mold die and the plate is injection molded.

It is particularly advantageous when casting the plate in the bottom to employ a photopolymerizable clear lacquer as the transparent plastic and to harden this lacquer under the influence of light. Such a method step is known per se from the publication Philips Technical Review, Vol. 40, No. 10, 1982, p. 290, particularly in connection with FIG. 4. The clear lacquer is pressed by a plexiglass pane into the depression of the bottom die and is hardened by radiation with ultraviolet light through the plexiglass paint. In the method of the invention, the plexiglass paint is stripped from the cast light guide channels after the clear lacquer has hardened and after the light guide channels have been cast out.

For the manufacture of the bottom die, grooves are advantageously incised line-by-line in the lacquer substrate, the respective depth and width of these grooves corresponding to the height of and the spacings between the web-like elevations on the transparent plate to be formed. A form impression of that side of the substrate layer comprising the grooves is acquired, this form impressions forming the bottom die.

A further resolution of the aforementioned object is characterized in that a carrier plate with depressions arranged line-by-line on one side is pressed, the respective depth and width of the depressions corresponding to the cross-dimensions of the light guide channels; and that transparent material is introduced into the depressions for fashioning the light guide channels. This modification of the method also enables the manufacture of a very flat illumination unit having only a very few component parts, whereby the light guide channels embedded in the depressions are well protected against external influences.

When transparency of the carrier plate is desirable, then the carrier plate is pressed from transparent material whose refractive index is greater than that of the light guide channels. What is achieved in this manner is that the light conducted in the light guide channels is totally reflected and no light scatter can emerge from the light guide channels. A diminution of the influences of scattered light is also advantageously achieved in that the carrier plate is mirrored at its side provided with the depressions before the introduction of the transparent material for the light guide channels.

The manufacture of the carrier plate with the depressions advantageously occurs in that the carrier plate is cast using a bottom die. For the manufacture of the bottom die, grooves are incised line-by-line in a substrate layer, the respective depth and spacing of these grooves from one another corresponding to the cross sectional dimensions of the light guide channels to be formed. A first form impression of that side of the substrate layer comprising the grooves is made and a second form impression which forms the bottom die is made from the first form impression. The method guarantees an accurate formation of the depressions for the light guide channels.

In order to create micropoint-associated light exit regions along the light guide channels, it is provided that the notches are incised into the substrate layer by columns perpendicular to the grooves before the grooves are cut into the substrate. Both in the method which provides for the pressing of a transparent plate with web-like elevations and in the method comprising the formation of a carrier plate with depressions arranged line-by-line, these notches advantageously yield corresponding notches in the web-shaped elevations or, respectively, in the depressions and, therefore, in the light guide channels, so that light beams that are coupled into end faces of the light guide channels are reflected at the notch faces facing the light source that they impinge on the channel wall in the light exit region of the light guide channel roughly perpendicularly and can therefore emerge therefrom. A uniform out-coupling of light along the individual light guide channels is advantageously achieved in that, upon manufacture of the bottom die, the notches are incised into the substrate layer with a depth which becomes increasingly greater by columns.

According to a feature of the invention, the substrate layer itself can be fashioned in the form of a lacquer layer on a carrier layer.

In view of a high cut accuracy when sizing the grooves and notches into the substrate layer, a metal plate (for example a plate of copper or aluminum) can also be alternatively employed for the substrate layer.

A particularly simple and therefore cost-effective manufacture of the bottom die for the method of the invention is achieved in that a silicon caoutchouc impression is employed as the form impression.

In a modification thereof, a particularly high accuracy in the formation of the light guide channels can be achieved with respect to their dimensions and their arrangement in that, for the manufacture of the form impression, a conductive layer is applied to that side of the substrate layer comprising the grooves. A metal layer is built up on the conductive layer in an electroplating bath, the metal layer, freed from the substrate layer, forming the impression (the bottom die) given an adequate thickness. In the case of a lacquer layer as the substrate layer, the conductive layer serves as a foundation for the electro deposition of the metal layer. When the substrate layer is composed of a metal plate such as, for example, copper, then the copper is etched away in the last step in the manufacture of the bottom die and the conductive layer (for example, a silver coating) serves the purpose of stopping the etching process at the metal layer which forms the bottom die.

BRIEF DESCRIPTION OF THE DRAWINGS

Other objects, features and advantages of the invention, its organization, construction and operation will be best understood from the following detailed description, taken in conjunction with the accompanying drawings, on which:

FIGS. *1a*, *1b*—*6a*, *6b* schematically illustrate the individual method steps for the manufacture of a flat illumination unit in which the light guide channels are fashioned first and are subsequently cast out in a layer;

Figure 16:
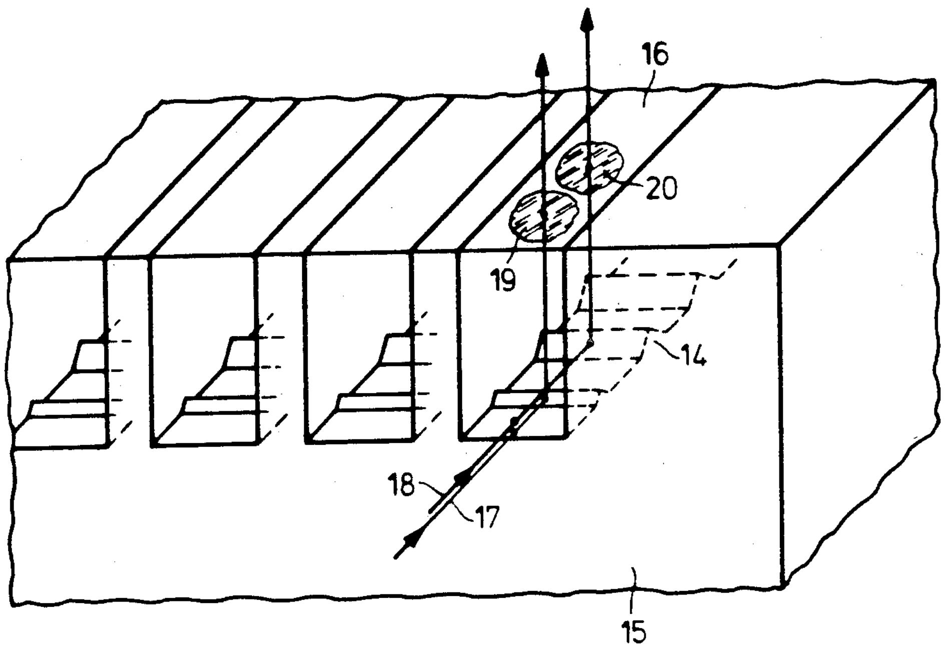

FIGS. *7a*, *7b*—*9a*—*9b* illustrate alternative sub-steps in view thereof for the formation of the light guide channels with the assistance of photopolymerizable clear lacquer;

FIGS. 10*a*, 10*b*—15*a*, 15*b* illustrate individual steps of a further modification of the method for the manufacture of the illumination unit in which the light guide channels are introduced into depressions of a carrier plate; and FIG. 16 is a pictorial representation of a portion of a completely manufactured illumination unit.

DESCRIPTION OF THE PREFERRED EMBODIMENTS

It should be noted regarding FIGS. 1*a*, 1*b*—15*a*, 15*b* that the sectional views therein are to be interpreted such that the sub-views to the right of the dot-dash parting lines respectively extend into the plane of the drawing at a right angle relative to the sub-view shown on the left.

In accordance with a first embodiment of the method of the invention, a substrate layer composed of a thin lacquer layer 2 is applied to a carrier layer 1 (FIGS. 1*a*, 1*b*) which can be composed of, for example, a glass plate. Notches 3 are first incised in column-by-column into the lacquer layer 2, the notches 3 being produced with a progressively greater notch depth from column-to-column. Given a preferred column spacing of about 0.5 mm between the notches 3, the notch depth lies in the range of 0.004 mm–0.5 mm. The notch faces 4 of the notches 3 are preferably inclined at an angle of about 45° relative to the plane of the lacquer layer 2. In a second method step, grooves 5 having a preferably rectangular cross section are cut into the lacquer layer 2 in line-by-line fashion at right angles relative to the notches 3. The incision depth for the grooves 5 is thereby at least as great as that of the most deeply incised notch. In view of the dimensions specified for the notches 3, the grooves 5 are preferably executed with a width of about 0.15 mm in a line spacing of about 0.5 mm (respectively calculated from the center of a groove to the center of the neighboring groove). The carrier layer 1 comprising the lacquer layer 2 structured by way of the incisions forms a master form.

In a next method step, a conductive layer 6 (shown disproportionately thick) is applied to the lacquer layer 2, being preferably applied in the form of a metal coating in a sputter chamber; however, it is also possible to vapor deposit this metal coating. This method step serves the purpose of preparing the master form for a subsequent electroplating process in which a metal layer 7 (FIGS. 2*a*, 2*b*) is built up on the conductive layer 6 in an electrolytic bath. The preferred material for the metal layer 7 is nickel. The electroplating process is ended when the metal layer 7 reaches a thickness at which it fills out the notches 3 and the grooves 5 in the lacquer layer 2 and otherwise forms a plate that exhibits adequate mechanical stability.

For the purpose of reinforcing the metal layer 7, the rear side thereof facing away from the lacquer layer can be covered with an additional stabilization layer 7*a* (FIGS. 3*a*, 3*b*) of, for example, casting resin. After it has been pulled from the lacquer layer 2, the metal layer 7 with the extremely thin conductive layer 6 and with the rear stabilization layer 7*a* yields a bottom die 8. With the assistance of the bottom die 8 useable as a pressing mold, plates 11 (FIGS. 4*a*, 4*b*) can be pressed in a transfer mold 9 from molten, transparent plastic 10 such as, for example, plexiglass or polycarbonate, web-shaped elevations 13 which are provided with notches 14 by columns in the transverse direction being respectively fashioned line-by-line on the upper side 12 of these plates 11. With respect to the arrangement and the dimensions of the web-shaped elevations 13 with the notches 14, the upper side 12 of the transparent plate 11 corresponds to the structure of the lacquer layer 2 of the master form of FIGS. 1*a*, 1*b*.

In a following method step, the upper side 12 with the web-shaped elevations 13 of the transparent plate 11 is mirrored. Subsequently, the upper side 12 of the transparent plate 11 is coated with a casting compound 15 which covers the web-shaped elevations 13 and fills out the notches 14 as well as the clearances between the web-shaped elevations 13 (FIGS. 5*a*, 5*b*).

When the casting compound has hardened, then, proceeding from the underside facing away from the upper surface 12, the transparent plate 11 is eroded to such a degree that only the formerly web-shaped elevations 13 in the form of light guide channels 16 respectively remain surrounded by the casting compound 15 on three sides (FIGS. 6*a*, 6*b*). The erosion of the plate 11 can occur, for example, by way of a mechanical method, for example grinding and subsequent polishing, or can occur by way of chemical etching.

Figure 7A:
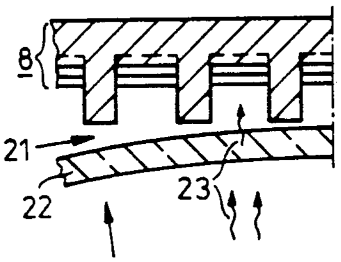
Figure 7B:
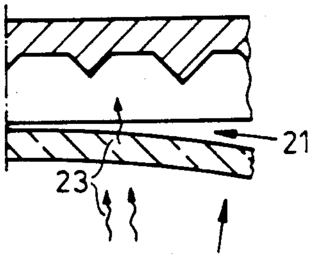
Figure 8A:
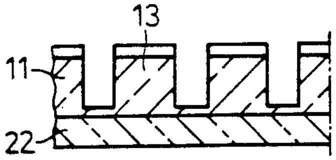
Figure 8B:
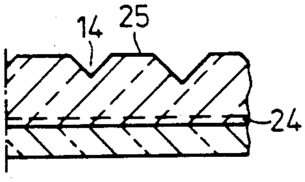
Figure 9A:
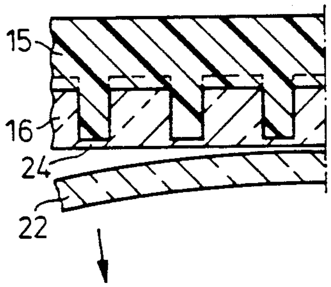
Figure 9B:
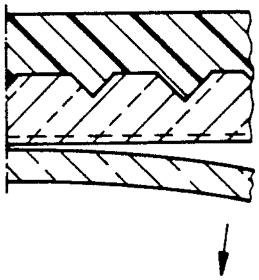

As an alternative to the modifications of the method set forth above, the illumination unit can be finished in accordance with the steps illustrated in FIGS. 7*a*, 7*b*—9*a*, 9*b* following upon the method step illustrated in FIGS. 3*a*, 3*b*. For this purpose, the photopolymerizable clear lacquer layer 21 is pressed into the depressions of the bottom die 8 with the assistance of a plexiglass plate 22. Subsequently, the clear lacquer 21 is radiated with ultraviolet light 23 through the plexiglass plate 22, so that the clear lacquer hardens to form a transparent plate 11 which is composed of a thin bottom plate 24 comprising web-shaped elevations 13 arranged in lines and provided with notches 14 (FIGS. 8*a*, 8*b*). Subsequently, the bottom die 8 is separated from the transparent plate 11 and the surface 25 of the transparent plate 11 fabricated in this manner is mirrored. In a following method step, the mirrored surface 25 of the plate 11 is coated with a casting compound 15. After the casting compound 15 has hardened, the plexiglass plate 22 adhering to the transparent plate 11 is pulled off so that, except for the extremely thin bottom plate 24, it is essentially only the web-shaped elevations of the transparent plate which remain surrounded by respectively three sides by the casting compound 15 in the form of the light guide channel 16 (FIGS. 9*a*, 9*b*).

The casting compound 15 therefore forms a layer in which the light guide channel 16 with their notches 14 arranged in columns are embedded in lines. FIG. 16 illustrates this structure by way of a perspective view of a portion of the illumination unit manufactured in accordance with the invention and composed of the layer 15 comprising the light guide channel 16. It is shown on the basis of two parallel light beams 17 and 18 how, given lateral in-coupling of the light into the end faces of a light guide channel 16, a uniform out-coupling of the light from the light exit regions 19 and 20 in the channel wall of the light guide channel 16 is achieved over the longitudinal extent of the light guide channel 16 due to the notches 14 of different depths in the light guide channel 16.

FIGS. 10*a*, 10*b*—15*a*, 15*b* shall be referred to below for the manufacture of an illumination unit of the type illustrated in FIG. 16 in accordance with a further alternative of the method of the invention in which the light guide channels are composed of transparent material introduced or, respectively, pressed into depressions of a carrier plate.

As FIGS. 10*a*, 10*b* illustrate, a master form comprising grooves 5 and notches 3 is first produced just as in the method set forth above. Whereas a thin lacquer layer was fashioned as a substrate layer in the above method, the grooves 5 and the notches 3 are incised into a metal plate 25, preferably composed of copper in accordance with the illustrations of FIGS. 10*a*, 10*b*. In general, however, the alternative use of a lacquer layer or of a metal layer as a substrate layer for the incision of the grooves 5 and the notches 3 is possible in both alternatives of the method.

In a further method step, a thin, conductive layer 26 of, preferably, silver is applied to that side of the metal plate 5 provided with the grooves 5 and the notches 3. A metal layer 27 is built up on this thin conductive layer 26 in an electrolytic bath; the preferred material for the metal layer is nickel (FIGS. 11*a*, 11*b*).

In a following etching process, the metal plate 25 composed of copper is etched away down to the conductive layer 26. The conductive layer 26 (silver) itself is resistant to the etchant employed, so that the etching ends as soon as the entire metal plate 25 is etched away. Together, the remaining metal layer 27 and the conductive layer 26 form a first form impression (FIGS. 12*a*, 12*b*).

After electropolishing, a second form impression 29 is produced therefrom, as may be seen in FIGS. 13*a*, 13*b*. With respect to its surface structure, this second form impression 29 corresponds to the metal plate 25 comprising the grooves 5 and the notches 3 shown in FIGS. 10*a*, 10*b*.

In accordance with the illustration in FIGS. 14*a*, 14*b*, the second form impression 29 is used as a bottom die 8 and a transfer mold 9. Carrier plates 30 (FIGS. 15*a*, 15*b*) of plastic 10 whose surface structure corresponds to that of the layer 15 shown in FIG. 16 can be pressed in the transfer mold 9 with the assistance of the bottom die 8. The light guide channel 16 of transparent material are subsequently pressed into the depressions of the carrier plates 30 (FIGS. 15*a*, 15*b*).

The formation of the light guide channel 16 in the carrier plate 30 occurs in a manner corresponding to that set forth in the aforementioned method embodiment with reference to FIGS. *7a*, *7b*, preferably with the assistance of photopolymerizable clear lacquer which is pressed by way of a plexiglass plate. Subsequently, the clear lacquer is radiated with ultraviolet light through the plexiglass plate, so that the clear lacquer hardens and, after the plexiglass plate has been removed, remains in the depressions of the carrier plate in the form of the light-conductive rods.

It is also possible within the scope of the invention to acquire the form impressions from the substrate layer 2 or, respectively, 25 with the assistance of silicon caoutchouc instead of by way of an electroplating process.

Dependent on the selection of the light guide channels, there are numerous possible uses for the illumination unit, for example as a planar illumination unit for optical scanners, for example, or as a high-resolution display.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method of making a flat illumination unit, comprising the steps of:
- forming a plurality of spaced parallel transparent rods as light guide elements on one side of a plate;
- applying a casting compound over and between the light guide elements and permitting the compound to harden; and
- removing material of the plate from the side opposite that carrying the light guide elements until only the light guide elements, each surrounded on three sides by the casting compound remain.

2. The method of claim 1, wherein the step of applying a casting compound is further defined as:
- applying a casting compound of transparent material having an optical index of refraction which is lower than that of the light guide elements.

3. The method of claim 1, and further comprising the step of:
- mirror coating of the one side of the plate carrying the light guide elements before applying a casting compound.

4. The method of claim 1, wherein the step of forming transparent rods as light guide elements is further defined as:
- press forming transparent rods securing the same to the plate along parallel lines.

5. The method of claim 4, wherein the step of removing material of the plate is further defined as:
- stripping the plate from the light guide elements after the casting compound has hardened.

6. The method of claim 1, wherein the step of forming transparent rods as light guide elements in further defined as:
- forming web-shaped elevations as the light guide elements in a plate of transparent material.

7. The method of claim 6, wherein the step of forming web-shaped elevations is further defined as:
- molding a transparent plastic molding plate with a bottom die having depressions corresponding to the web-shaped elevations to be formed by the molding.

8. The method of claim 7, wherein the step of molding is further defined as:
- applying a photopolymerizable clear lacquer as transparent plastic material; and
- hardening the plastic material by radiating it with light.

9. The method of claim 6, wherein the step of forming web-shaped elevations is further defined as:
- injection molding a transparent plastic plate with a bottom die as a press die having depressions corresponding to the web-shaped elevations to be formed by the molding.

10. The method of claim 9, and further comprising the step of:
- before pressing, making the press die by the steps of
  - forming a plurality of webs by incising a plurality of spaced parallel grooves into a substrate to a predetermined depth and a predetermined width so that the web cross sections are equal to the cross sectional dimensions of light guide elements to be formed in the illumination unit, and
  - making a form impression of the grooved side of the substrate.

11. The method of claim 10, and further comprising the step of:
cutting the notches in the lacquer layer in columns, transversely of the grooves.

12. The method of claim 11, wherein the step of cutting notches is further defined as: cutting progressively deeper notches along the lengths of the grooves.

13. The method of claim 12, wherein the step of making a press die is further defined as:
applying a lacquer layer onto a carrier layer;
cutting parallel grooves into the lacquer layer to a respective depth and width equal to the height and intermediate spacings of the elevations to be formed;
applying a conductive layer to the grooved lacquer layer;
electrolytically forming a metal layer on the conductive layer; and
removing the lacquer layer.

14. The method of claim 9, and further comprising the step of:
applying a lacquer layer onto a carrier as the substrate.

15. A method of making a flat illumination unit, comprising the steps of:
making a bottom press die by the steps of
incising a plurality of parallel grooves into a substrate line-by-line to a predetermined depth and a predetermined spacing relative to one another corresponding to the cross sectional dimensions of light guide elements to be produced in the illumination unit, making a first form impression of the grooved side of the substrate, and making a second form impression of the first form impression to be used for pressing a carrier plate;
prior to incising the grooves, incising a plurality of parallel notches in columns into the substrate perpendicular to the line direction of the grooves;
pressing a carrier plate with the bottom press die to produce a plurality of spaced parallel grooves in a substrate to a predetermined depth and a predetermined width equal to the cross sectional dimensions of light guide elements to be formed in the illumination unit; and
filling the grooves with the transparent material.

16. The method of claim 15, and further comprising the step of:
mirror coating the groove side of the carrier plate before filling the grooves.

17. The method of claim 15, wherein the step of incising notches is further defined as:
incising the notches progressively deeper from column-to-column.

18. The method of claim 17, and further comprising the step of:
applying a lacquer layer as the substrate onto a carrier layer.

19. The method of claim 17, and further comprising the step of:
applying a metal plate as an substrate onto a carrier layer.

20. The method of claim 15, wherein the step of making a first form impression is further defined as:
applying silicon caouthchouc to the grooved side of the substrate.

21. The method of claim 15, wherein the step of making the first form impression is further defined as:
applying a conductive layer to the grooved side of the substrate;
electrolytically building up a metal layer on the conductive layer in an electrolytic bath; and
removing the metal layer from the substrate.

* * * * *